3,396,030
PHOTOGRAPHIC SILVER HALIDE EMULSIONS
Howard C. Haas, Arlington, Mass., assignor to Polaroid
 Corporation, Cambridge, Mass., a corporation of
 Delaware
No Drawing. Continuation-in-part of application Ser. No.
 598,178, Dec. 1, 1966, which is a continuation-in-part
 of application Ser. No. 385,071, July 24, 1964. This
 application Oct. 19, 1967, Ser. No. 676,631
4 Claims. (Cl. 96—114)

This application is a continuation-in-part of my copending United States application Ser. No. 598,178, filed Dec. 1, 1966, now abandoned, which is in turn a continuation-in-part of my United States application Ser. No. 385,071, filed July 24, 1964, now abandoned.

The instant invention is primarily directed to hereinafter specified monomers and polymers, silver halide-containing emulsions comprising said polymers and photoresist systems employing said monomers and polymers.

It is a primary object of the present invention to provide and employ specified monomers and polymers as detailed hereinafter.

It is another object of this invention to provide thermally reversible gels comprising monomers and polymers of this invention.

Still another object of this invention is to provide thermo reversible gels having selectively varied melting points, mechanical properties and chemical properties.

A further object of this invention is to provide a novel method of forming a photoresist relief image employing monomers and polymers of this invention.

An additional object of the invention is to provide novel silver halide-containing emulsions comprising polymers of this invention.

Other objects of this invention will in part be obvious and will in part appear hereinafter.

The invention accordingly comprises the several steps and the relation and order of one or more of such steps with respect to each of the others and the product possessing the features, properties and the relation of elements which are exemplified in the following detailed disclosure and the scope of the application of which will be indicated in the claims.

For a fuller understanding of the nature and objects of the invention reference should be had to the following detailed description.

Monomers which may be utilized within the scope of the present invention are represented by the formula:

(A)
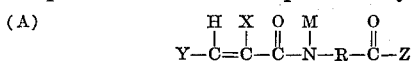

wherein:

Y is selected from the group consisting of hydrogen, methyl and phenyl groups;
X is selected from the group consisting of hydrogen, chloro, bromo, fluoro, cyano and lower alkyl groups, i.e., less than six carbon atoms;
R is a lower alkylene group, i.e., containing less than six carbon atoms;
M is selected from the group consisting of hydrogen and lower alkyl groups, e.g., containing less than six carbon atoms; and
Z is an amino group.

A preferred class of monomers within the scope of the instant invention may be used to form homopolymers and copolymers which, in water, unexpectedly form gels which exhibit thermal reversibility. Monomers of this preferred class may be represented by the formula:

(B)
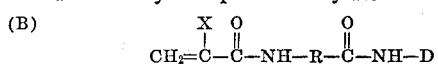

wherein:

X is a hydrogen, methyl, chloro, bromo, fluoro or cyano group;
R is an alkylene group comprising less than six carbon atoms and is preferably a methylene group; and
D is a hydrogen, methyl or ethyl group, and is preferably hydrogen.

It is to be understood that within the scope of the instant invention, the various moieties Y, X, M, R, Z and D may contain substituents, according to the desires of the operator, which will not render the compounds unusable for their intended purposes. For example, R might contain aryl, heterocyclic, alkyl, etc., substituents, whose presence or absence would be governed by the desired properties the operator intends to impart to the system; and, likewise, Z may be a primary, secondary or tertiary amino group, etc.

The monomers within the scope of the present invention may be prepared by one of two methods. The preferred method is disclosed in the copending U.S. application of Lloyd D. Taylor and Thomas E. Platt, Ser. No. 662,892, filed Aug. 24, 1967, incorporated herein by reference. Very simply, that method comprises reacting ammonia or a primary or secondary amine with the reaction product of a trialkyl amine, an alkyl haloformate and a N-acrylyl amino acid. Examples of the utilization of the Taylor, et al. method in forming the compounds of the instant invention appear below.

Another method which may be utilized in the preparation of the compounds of the instant invention involves reacting acid chlorides, anhydrides and esters of the formulae:

(C) 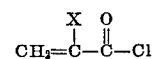

(D) 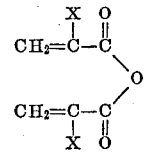

and (E) 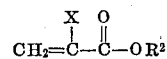

respectively, wherein: X is as defined above and the —OR² radical represents the residue of the alcohol used in forming the ester, with amino substituted aliphatic amides as represented by the formula:

(F) 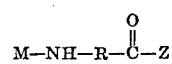

wherein: M, R and each Z are as defined above. As examples of compounds within Formulae C, D, and E which may be used in preparing the monomers within the scope of the present invention, mention may be made of the acid halides, anhydrides and esters of acrylic acid, methacrylic acid, α-chloroacrylic acid, α-bromoacrylic acid, α-fluoroacrylic acid, α-cyanoacrylic acid, etc.

When the compounds of the instant invention are made using the esters of Formula E it will be understood that the —OR² radical will be replaced during the reaction. Consequently, the alcohols used in forming the esters may be selected from alcohols in general. Preferably, the —OR² radical is the residue of an aliphatic alcohol.

As examples of amino-substituted aliphatic amides within Formula F which can be used in preparing the monomers within the scope of this invention, mention may be made of α-aminoacetamide (glycinamide), α-methylamino acetamide, i.e.,

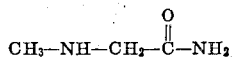

N-methyl-α-aminoacetamide, i.e.,

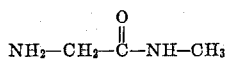

α - aminopropionamide, N-ethyl-α-methylaminobutyramide, N,N-diethyl-α-(methylamino)acetamide, N-methyl-α-(methylamino)acetamide, γ-amino-butyramide, N-methyl - γ - aminobutyramide, N-butyl-α-aminopropionamide, N,N-dimethyl-α-aminoacetamide, etc.

The reaction between the acid chlorides, anhydrides, and esters within Formulae C, D and E and the amines within Formula F proceeds quite readily. When using the acid chlorides, the reaction may be facilitated by running it in the presence of an acid acceptor. Usually the use of a small amount of a polymerization inhibitor, e.g., hydroquinone, will be desirable in order to prevent premature polymerization.

The first method discussed, i.e., that method disclosed in the Taylor et al. application, is considered to be far superior to the last method discussed both from the point of view of ease of operation and yield. By utilizing the Taylor et al. method, virtually any conceivable polypeptide monomer may be synthesized to suit an individual operator's desires.

Examples of monomers which may be utilized in the present invention are:

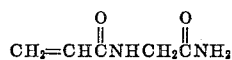
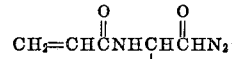
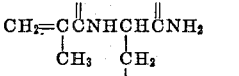
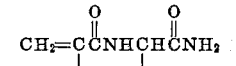
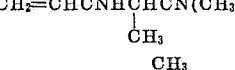
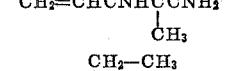
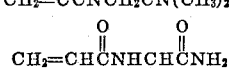
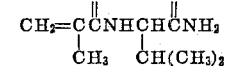
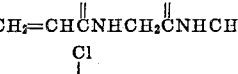
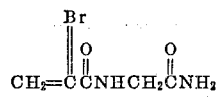
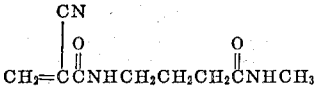
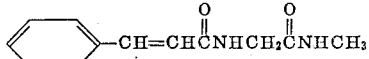
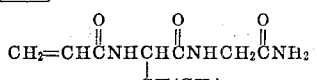
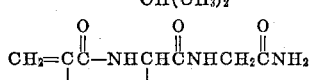
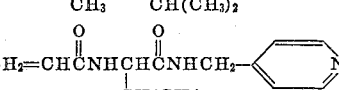
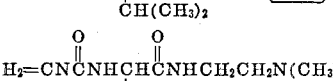
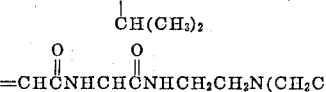
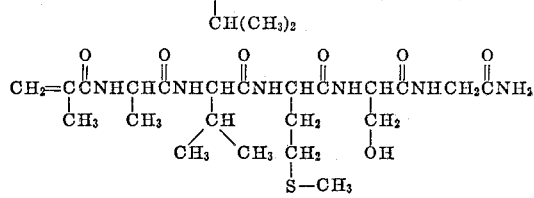
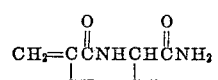
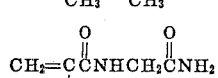
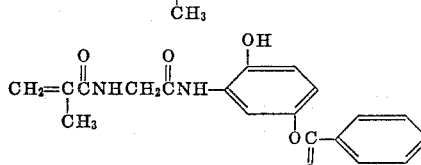
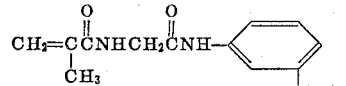
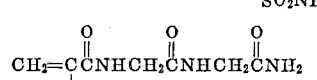
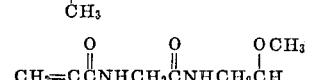
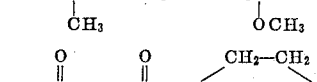
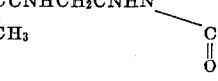
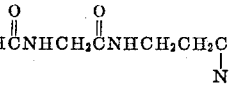

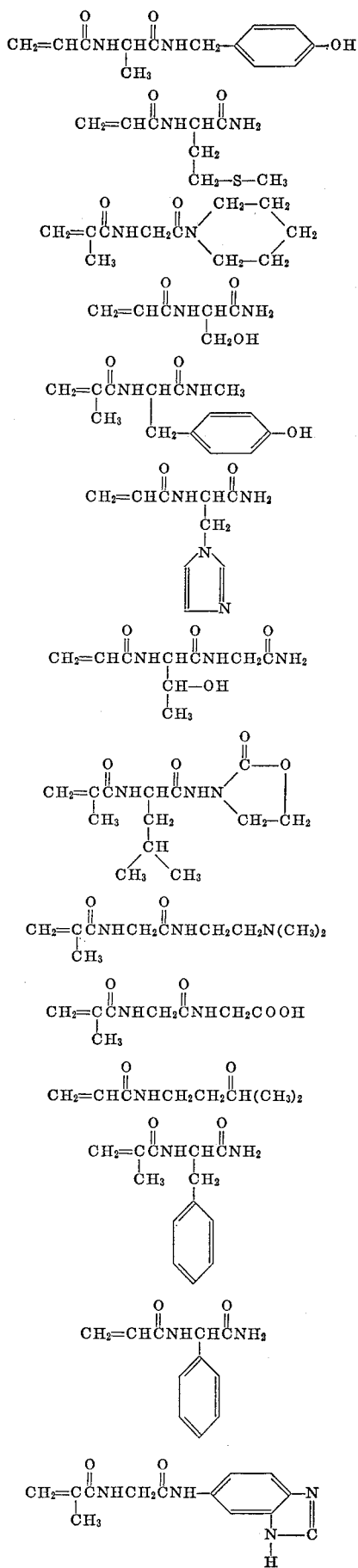

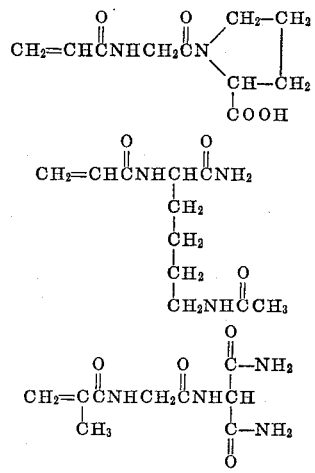

As is well known in the photographic art, gelatin is more than a medium to hold photosensitive crystals in place on a glass, film, or paper base. It serves to regulate the sizes of the crystals when the silver halide is formed from solutions of silver nitrate and a halide, such as potassium bromide; it provides a suitable environment for modifying the size of the crystals formed; and it often contributes to the sensitivity of the crystal to light by containing sensitivity-promoting by-products. Finally, it is adsorbed by the crystal producing a barrier which results in a plurality of advantages including enhancing the difference in the rate at which an exposed and unexposed crystal is reduced to silver by a silver halide developing agent. It is, in other words, a protective colloid.

There are, however, many drawbacks to using gelatin in photographic emulsions. For example, each new batch of gelatin must be analyzed to determine its own particular photographic activity and must be supplemented with appropriate additives to achieve the desired photographic properties. In addition, gelatin's permeation characteristics and adhesive properties are not entirely predictable from batch to batch. These and other drawbacks make it desirable to find binder mediums for photosensitive films which can be used without considering inherent photographic activity, and which can repeatedly be made with predictable physical and chemical characteristics.

It is believed that gels comprising the instant polymers are the first known vinyl homopolymers which behave in a thermally reversible manner and offer a unique and very flexible system for attacking the problems of obtaining synthetic substitutes for photographic gelatin. It has also been found that by copolymerization, vinyl residues can be introduced into the polymer chain in predetermined amounts and in known sequence distributions in order to arrive at resultant structures with desired physical and chemical properties, such as gel strength, rigidity, rates and heats of gelation, silver halide crystal growth, photographic speed, etc. Likewise, the melting point of gels made with the compounds of this invention vary with the polymer concentration in the gel system and its molecular weight. The melting point as well as the properties mentioned above may be altered by copolymerization with selected ethylenically unsaturated monomers. In a preferred embodiment, the thermo-reversible gels are used in a silver halide emulsion as a suspending matrix material in conjunction with gelatin; the precise composition of the matrix system being dependent upon the properties desired of the system. For example, by varying the synthetic gel concentration, melting point and other pertinent properties may be varied to achieve a system tailored to the operator's desires.

As examples of ethylenically unsaturated monomers which may be polymerized with the monomers of this invention, mention may be made of the $\alpha,\beta$-unsaturated carboxylic acids, esters, amides, anhydrides and nitriles, e.g., acrylic acid, α-chloroacrylic acid, methacrylic acid, crotonic acid; methyl acrylate, ethyl methacrylate, acrylamide, N,N-diethyl-methacrylamide, N-(hydroxymethyl) acrylamide, acrylic anhydride and acrylonitrile; vinyl esters of carboxylic acids, e.g., vinyl acetate, vinyl thioacetate, vinyl butyrate, vinyl laurate and vinyl stearate; vinyl and vinylidene halides, e.g., vinyl chloride and vinylidene halides, e.g., vinyl chloride and vinylidene chloride; N-vinylimides, e.g., N-vinylphthalimide and N-vinylsuccinimide; ketones, e.g., methyl vinyl ketone and methyl isopropenyl ketone; maleic, fumaric and itaconic acids and esters of such acids; maleic anhydride, maleimide and N-substituted maleimides; diesters of polyhydric alcohols, e.g., the diacrylates and dimethacrylates of ethylene glycol, hexamethylene glycol and diethylene glycol; olefines such as butadiene and isoprene; and miscellaneous monomers such as 2-amino-ethyl vinyl ether, styrene, nuclear substituted styrenes, e.g., methyl styrene, p-methoxystyrene, p-thioacetoxy styrene, and chlorostyrene, vinyl pyridine, N-vinyl pyrrolidone, etc.

Generally the polymers do not form gels in water at concentrations of 1 gm. per 100 ml. or less unless the molecular weight of the polymer is reasonably high. However, at concentrations below which gel formation takes place, definite aggregation of chains is present, as indicated by much higher intrinsic viscosities in water as compared with 2 M sodium thiocyanate, which has been demonstrated to yield molecular dispersed solutions of high molecular weight gelatin. Like acrylamide, polymerization of the monomers of the instant invention in water results in the formation of crosslinked, water insoluble, water swellable polymers, while polymerization in alcohol and formamide yield low viscosity water-soluble products. The preferred products are water soluble polymers of intermediate molecular weight. The preferred method for preparation of the polymers is polymerization in water in the presence of low molecular weight alcohol. The polymerization may be catalyzed by various means such, for example, as heat, ultraviolet light, and free radical catalysts. In a preferred embodiment, free radical catalysts are employed. As examples of such catalysts, mention may be made of azobisisobutyronitrile, diazoaminobenzene, benzoyl peroxide, tertiary butyl peroxide, tertiary butyl hydroperoxide, diacetyl peroxide, diethyl peroxy-carbonate, hydrogen peroxide and potassium persulfate.

As noted, in a preferred embodiment the polymerization is carried out in a solvent; however, it is contemplated that when desired, and depending upon the particular monomers used, bulk polymerization techniques may be employed. Bulk polymerization could involve polymerization of the melt or crystals by methods well known to any polymer chemist. Additionally, the monomers may be polymerized in solution at room temperature using redox initiators. The amount of catalysts and the temperature at which the polymerization is carried out may be varied to suit particular needs. Generally, the polymerization will proceed at a satisfactory rate by carrying out the polymerization about 60° to 100° C. using 0.1 to about 2.0% catalyst (based on the weight of the monomer).

It has been found that homopolymers of the monomers of the present invention can only be formed when the β-unsaturated carbon atom contains hydrogen constituents. Any substituent for the hydrogen, as, e.g., methyl, phenyl, etc. prevents homopolymerization. However, such substituted monomers will readily polymerize with other suitable monomers, such as those listed above, to form copolymers.

Genatin, with silver salts incorporating therein, contains, as a by-product of the salt formation, entrained water soluble salts which should be removed during photographic emulsion manufacture. One way of accomplishing this is, for example, by phthaloylating the gelatin (i.e., reacting it with phthalic anhydride) which remains water soluble but precipitates upon a reduction of pH. The soluble salts can then be removed, by decantation, subsequent to precipitation of the gelatino silver salt dispersion. The gelatin may be redissolved by raising the pH. When the monomers of the instant invention are copolymerized with, for example, monomeric acids, or other monomers providing an acid copolymer, they still form thermo-reversible gels, but on lowering the pH will be flocculated just like phthaloylated gelatin to expedite removal of entrained water soluble salts. Redissolution is accomplished by raising the pH.

It has additionally been found that the compounds of the present invention are useful for preparing relief images on a substrate by photoresist techniques.

Specifically, specified monomers of the present invention, that is, monomers with Formula A wherein Y is hydrogen, may be photopolymerized by being exposed to actinic radiation, preferably in the presence of a polymerization initiator such as a photo reduceable dye, as for example, rose bengal, methylene blue, riboflavin, phloxine, erythrosine, eosin, or the like, which when irradiated, provide free radicals, facilitating photopolymerization of the monomer.

U.S. Patent No. 2,875,047, issued on Feb. 24, 1959, discloses a technique for the photopolymerization of acrylamide, which is an anti-gelation agent for gelatin; that is, acrylamide in a galtin solution acts to inhibit gelation. This is due to the fact that gelatin gels by a hydrogen bonding mechanism between the amide groups in neighboring gelatin molecules. Since the acrylamide molecule contains only one amide group it acts as a gelation inhibitor by competing for bonding sites. The photopolymerizable monomers of the instant invention contain at least two amide groups in each molecule and, accordingly, act as hydrogen bonding crosslinking agents.

It will also be evident that by using the monomers of the present invention in a photoresist system in combination with polymers made from said monomers, or in combination with gelatin, gelation will occur as soon as the composition is cast upon a substrate as long as the casting temperature is below the melting point of the gel. This drastically decreases the drying requirements of the resist solution after it is cast. Without extensive drying, the resist composition of the prior art would be soupy and unmanageable.

The following non-limiting examples illustrate the preparation of the monomers and polymers and their use within the scope of the present invention.

Example I 15 gm. (0.136 mole) of glycinamide hydrochloride was slurried into 100 ml. of dry diethyl ether containing 14.6 gm. (0.162 mole) of acrylyl chloride. The solution was cooled to 0 to 5° C. and a solution comprising 38 gm. of potassium carbonate in 40 ml. of water was added dropwise with stirring. Stirring was continued for another hour. The aqueous phase, which separated was isolated and evaporated to dryness under vacuum at 35° C. or under. The resulting residue was extracted with acetone. Upon concentrating the acetone solution and cooling it to 0° C., 12 gm. (69% of theoretical) of N-acrylylglycinamide crystallized out. Upon recrystallization from acetone, the compound had a melting point of 129° C. and showed the following elemental analysis:

Found: C, 46.7; H, 6.2; N, 21.7. Theoretical: C, 46.8; H, 6.3; N, 21.8.

Example II

The procedure of Example I was repeated except that about 0.162 mole of methacryl chloride was used in place of the acrylyl chloride. Upon recrystallization from benzene containing a small amount of acetone, the N-methacrylylglycinamide produced had a melting point of 138° C. and showed the following elemental analysis:

Found: C, 50.5; H, 7.0; N, 19.9. Theoretical: C, 50.7; H, 7.0; N, 19.7.

The following non-limiting examples illustrate the polymerization of polymers within the scope of the present invention.

Example III 2 gm. of the N-acrylylglycinamide prepared in Example I was dissolved in 10 cc. of ethanol, containing 0.02 gm. of azobisisobutyronitrile and polymerized for two hours at 70° C. The resulting polymer was insoluble in ethanol and precipitated out. It was washed with more ethanol and then further purified by precipitating it into acetone from an aqueous solution. A 5% aqueous solution of the resulting poly-N-acrylylglycinamide yielded a gel which melted sharply at 38–39° C. and reformed at 35–36° C.

The refractive index of poly-N-acrylylglycinamide at room temperature is $n_D^{25}=1.542$ compared to values of 1.539 to 1.541 for gelatin and other like proteins.

Example IV 2.0 gm. of the N-methacrylylglycinamide prepared in Example II was dissolved in 10 cc. of water comprising 0.02 gm. of azobisisobutyronitrile and polymerized for about 2 hours at 70° C. Additional water was then added and the resulting poly-N-methacrylylglycinamide was precipitated into acetone. A 5% aqueous solution of the polymer formed a thermally reversible gel.

Example V

The compound methacrylyl-alinine amide

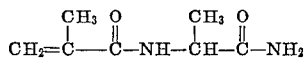

is prepared according to the following procedure:

12.7 g. of methacrylyl alinine is slurried in 100 ml. of ethyl ether and cooled to about 15° C. 7.8 ml. of ethyl chloroformate is added and subsequently, 11.5 ml. of triethylamine is added dropwise over a one-half hour period keeping the temperature at about 15° C. The mixture is stirred for about two hours and the triethylamine hydrochloride which is formed is filtered off. Anhydrous ammonia is bubbled through the filtrate and a white precipitate begins to form almost immediately. The ammonia is bubbled through for about an hour and the resultant solid which is formed is vacuum dried. The yield was 75% methacrylyl-alinine amide with a melting point of 146–148° C.

*Elemental analysis.*—Calculated: C, 53.9%; H, 7.7%; N, 17.9%. Found: C, 53.8%; H, 7.8%; N, 17.9%.

Example VI

The compound acrylyl-methionine amide,

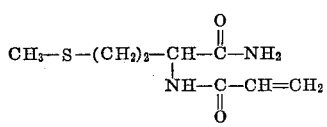

was prepared according to the method described in Example V utilizing:

Acrylyl methionine _____ gms__ 1.02
Ethyl chloroformate _____ ml__ 0.59
Triethyl amine _____ ml__ 1.4
Ether _____ ml__ 50.0

During the reaction little or no evolution of $CO_2$ was noted. Likewise, there was very little exotherm. The mixture was allowed to stir for two hours at room temperature and ammonia was then bubbled through the solution and resulted in immediate cloudiness. After a half-hour, off-white crystals of acrylyl-methionine amide were filtered off. They were recrystallized and found to have a melting point of from 152–154° C.

*Elemental analysis.*—Calculated: C, 47.5%; H, 6.9%; N, 13.9%; O, 15.9%; S, 15.8%. Found: C, 47.3%; H, 6.9%; N, 13.6%; O, 16.0%; S, 16.2%.

Example VII

The compound acrylyl-valyl glycinamide

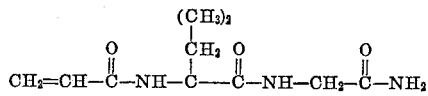

was prepared by the following synthesis:

3.4 g. of acrylyl-valine was slurried in 30 ml. of ether and cooled to about 15° C. 2 ml. of ethyl chloroformate was added and subsequently 1.4 g. of glycinamide dissolved in 2.5 ml. of acetone was added dropwise to the solution. 2.8 ml. of triethyl amine was added and after two hours precipitated triethyl amine hydrochloride was filtered off. Anhydrous ammonia was bubbled through the clear filtrate for about an hour and the product was subsequently filtered and dried under vacuum. During the instant procedure it was found desirable to evaporate all the solvents prior to the addition of the triethyl amine and redissolve the system using only ether. The melting point of the acrylyl-valyl-glycine amide is 183°–185° C.

*Elemental analysis.*—Calculated: C, 52.8%; H, 7.5%; N, 18.5%. Found: C, 52.9%; H, 7.6%; N, 18.4%.

Example VIII

As pointed out above, certain polymers of the instant invention, that is, where Y of Formula A is hydrogen, form thermally reversible gels in water. In order to determine the effects of added reagents on gelation, 2 ml. portions of a gel of a 5% aqueous solution of poly-N-acrylylglycinamide were treated with various reagents. The results appear in Table I, below. The polymer used to prepare the gel was formed by polymerizing 31.3 gm. of N-acrylylglycinamide in 139 ml. water and 2.6 gm. isopropanol in the presence of 33.5 mgs. $K_2S_2O_8$. The reaction was carried out in a sealed tube under vacuum for 2 hours at 65° C. The homopolymer was purified by several reprecipitations from water into methanol and dried under vacuum at 40° C.

TABLE I.—THE EFFECT OF ADDED REAGENTS ON GELATION

| Added Reagent | Effect at Room Temp. | On Cooling to 0° C. |
|---|---|---|
| Distilled $H_2O$, 15 drops | Gel dissolves | Gel reforms. |
| Acetic acid, glacial, 15 drops | do | Remains dissolved. |
| Formic acid, glacial, 15 drops | do | Do. |
| Aqueous sodium hydroxide (10%), 10 drops | Gel becomes more rigid. | |
| Hydroquinone: | | |
| Small amount | No effect | |
| Large amount | Precipitate | |
| Urea, small amount | Gel dissolves | Do. |
| Phenol: | | |
| Small amount | No effect | |
| Large amount | Precipitate | |
| NaCNS, small amount | Gel dissolves | Do. |
| N-acrylylglycinamide, small amount | Gel becomes more rigid. | |
| 1M-Hg $(C_2H_3O_2)_2$ several drops | Immediate precipitate. | |
| 1M-$Al_2(SO_4)_3 \cdot 18H_2O$, 15 drops | Gel becomes more rigid. | |
| 1M solutions of $BaCl_2$, $AgNO_3$, $CrCl_3$, $CoCl_2$, $NaCl_2$, $Pb(C_2H_3O_2)_2$ or $FeCl_3$, 15 drops. | Gel dissolves | Do. |

Many of the results are similar to those observed with gelatin. Small quantities of strong hydrogen bond-breaking reagents, urea and thiocyanate, readily dissolve the gel, whereas with weaker ones, like acetic and formic acid, and some of the inorganic salts, larger quantities are required. That N-acrylylglycinamide monomer actually increases the rigidity of the gel implies that it is a polyfunctional hydrogen bonding material. This property makes it of interest in the photoresist systems identified above.

EXAMPLE IX

In order to demonstrate the effect of concentration on gel melting points, aqueous solutions containing various weights of poly-N-acrylylglycinamide (intrinsic viscosity 2.91 in 2 m. sodium thiocyanate at 25° C.) were prepared and the melting points determined by pipetting 1 ml. samples into small test tubes and cooling the compositions down to 8° C. The tubes were inverted in a water bath at about 8° C. and the temperature of the bath was raised 10° C. per hour. The temperature at which the gels began to melt and descent in the tube was recorded as the melting point and tabulated in Table II. The poly-N-acrylylglycinamide was prepared by reacting 4.67 gms. of N-acrylyglycinamide in 20.7 ml. water and 0.39 gm. isopropanol in the presence of 5 mgs. $K_2S_2O_8$ for 2 hours at 75° C.

TABLE II.—GEL MELTING POINT (° C.) VS. CONCENTRATION

| Conc. (weight percent): | M.P. (° C.) |
|---|---|
| 5.27 | 24.0 |
| 8.72 | 34.0 |
| 12.34 | 40.5 |
| 14.0 | 43.5 |
| 22.20 | 54.5 |

The following example demonstrates the flocculating properties inherent in the novel compositions of the instant invention:

Example X

A solution of the following constituents was mixed:

| | Gms. |
|---|---|
| N-acrylylglycinamide | 1.02 |
| 2-methacrylamido-3-methylbutyric acid | .37 |
| Water | 4.54 |
| Isopropanol | .085 |
| Potassium persulfate | .001 |

The solution was cooled in an acetone-Dry Ice bath and flushed three times with nitrogen. It was then sealed, polymerized for two hours at 75° C., dissolved in water, precipitated into methanol, filtered and dried. The novel N-acrylylglycinamide-2-methacrylamido-3-methyl butyric acid copolymer was then dissolved in water at a temperature above its gelation point and was found to precipitate with a slight reduction in pH. Raising the pH caused the precipitant to go back into solution.

The following examples demonstrate the unique photopolymerization properties of the compounds of the instant invention:

Example XI

A solution having the following constitutents was mixed:

| | Gms. |
|---|---|
| Acrylamide | 15 |
| N,N' methylene bis acrylamide | .250 |
| Glycerol | 25 |
| Gelatin | 5 |
| Rose bengal | .005 |
| Allyl thiourea | .5 |
| Water | 15 |

The above solution was coated onto a microslide. It remained soupy and did not gel, but upon being exposed to a standard 500-watt projection bulb, it was noted that the solution did polymerize and a photoresist relief image appeared upon washing with water. It is theorized that gelation was inhibited due to the competition between the acrylamide and gelatin molecules for hydrogen-bonding sites.

Example XII

A solution having the following constituents was mixed:

| | Gms. |
|---|---|
| Acrylamide | 15 |
| N,N' methylene bis acrylamide | .250 |
| Gelatin | 15 |
| Rose bengal | .005 |
| Allyl thiourea | .5 |
| Water | 45 |

The above solution was coated onto a microslide and exposed to a standard 500-watt projection bulb. As in the example above, it was noted that the solution polymerized and a photoresist relief image appeared upon washing with water; however, when cast, no gelation was noted and the solution was soupy.

Example XIII

A solution having the following constituents was mixed:

| | Gms. |
|---|---|
| N,N' methylene bis acrylamide | .083 |
| N-acrylylglycinamide | 5 |
| Gelatin | 5 |
| Rose bengal | .0016 |
| Allyl thiourea | .166 |
| Water | 15 |

The above solution was coated onto a microslide and gelled almost immediately. It was exposed to a standard 500-watt projection bulb and it was noted that the solution polymerized and a photoresist relief image appeared upon washing with water. The presence of N-acrylylglycinamide in the resist solution instead of acrylamide, and the resultant immediate gelling indicates that, rather than competing for hydrogen-bonding sites, the N-acrylylglycinamide aids in cross-linking the gelatin since its molecule has two possible linking sites as compared to only one for acrylamide.

Example XIV

A solution having the following constituents was mixed:

| | Gms. |
|---|---|
| N,N' methylene bis acrylamide | .083 |
| N-acrylylglycinamide | 5 |
| Poly-N-acrylylglycinamide | 5 |
| Rose bengal | .0016 |
| Allyl thiourea | .166 |
| Water | 30 |

The above solution was coated onto a microslide and gelled immediately. It was then exposed to a standard 500-watt projection bulb and, as in the example above, it was noted that the solution polymerized and a photoresist relief image appeared upon washing with water. The compatibility of the N-acrylylglycinamide with its own polymer in forming gels is noteworthy.

Since certain changes may be made in the above products without departing from the scope of the invention herein involved, it is intended that all matter contained in the above description shall be interpreted as illustrative and not in a limiting sense.

What is claimed is:

1. A photographic silver halide emulsion comprising an additional copolymer comprising the reaction product resulting from the polymerization of a first monomer represented by the formula:

$$\begin{array}{cc} \text{H} & \text{X} \\ | & | \\ \text{C}=\text{C} & \text{M} \\ | & | \\ \text{Y} & \text{C}-\text{N}-\text{R}-\text{C}-\text{Z} \\ & \parallel \quad \quad \quad \parallel \\ & \text{O} \quad \quad \quad \text{O} \end{array}$$

wherein:

Y is selected from the group consisting of hydrogen, methyl and phenyl groups;
X is selected from the group consisting of hydrogen, chloro, bromo, fluoro, cyano and lower alkyl groups;
R is a lower alkylene group;
M is selected from the group consisting of hydrogen and lower alkyl groups; and
Z is an amino group;

with an ethylenically unsaturated comonomer copolymerizable therewith.

2. A photographic silver halide emulsion comprising a homopolymer comprising repetitive segments represented by the formula:

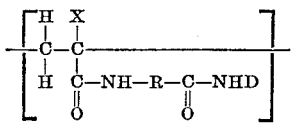

wherein:
X is selected from the group consisting of hydrogen, chloro, bromo, fluoro, cyano and lower alkyl groups;
R is a lower alkylene group;
D is selected from the group consisting of hydrogen, methyl and ethyl groups.

3. A photographic silver halide emulsion, as defined in claim 2, comprising poly-N-acrylylglycinamide.

4. A photographic silver halide emulsion, as defined in claim 2, comprising poly-N-methacrylylglycinamide.

References Cited

UNITED STATES PATENTS

| | | | |
|---|---|---|---|
| 2,409,126 | 10/1946 | Kenyon et al. | 260—83 |
| 2,749,331 | 6/1956 | Breslow | 260—89.7 |
| 3,048,572 | 8/1962 | Welch | 260—88.7 |
| 3,178,296 | 4/1965 | Minsk et al. | 96—114 |
| 3,271,158 | 9/1966 | Allentoff et al. | 96—114 |

NORMAN G. TORCHIN, *Primary Examiner.*

R. H. SMITH, *Assistant Examiner.*